J. Danner,
Coat and Hat Rack,
No. 52,974. Patented Mar. 6, 1866.
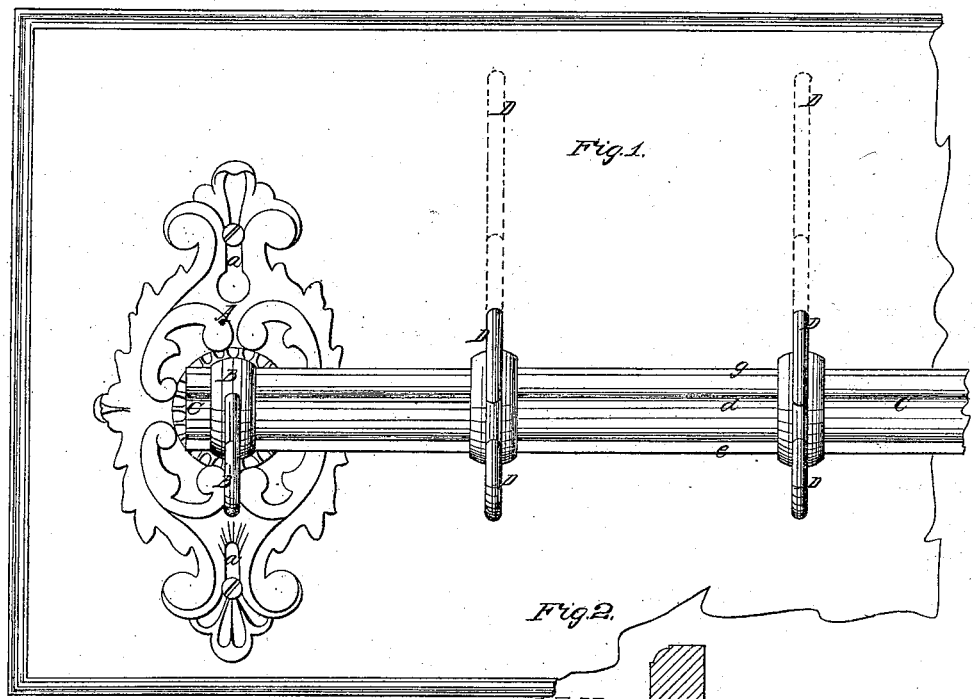
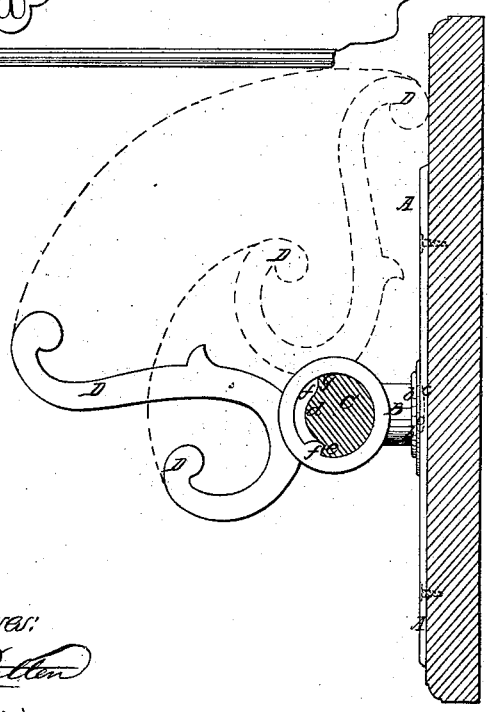
Witnesses:
Inventor:

UNITED STATES PATENT OFFICE.

JOHN DANNER, OF CANTON, OHIO.

COAT AND HAT HOOK.

Specification forming part of Letters Patent No. 52,974, dated March 6, 1866.

*To all whom it may concern:*

Be it known that I, JOHN DANNER, of Canton, in the county of Stark and State of Ohio, have invented certain new and useful Improvements in Coat or Hat Racks; and I do hereby declare the following to be a full, clear, and exact description of the same, reference being had to the accompanying drawings, making a part of this specification, in which—

Figure 1 represents a front view of a section of a coat or hat rack made after my invention. Fig. 2 represents an end view of the same.

Similar letters of reference, where they occur in the separate figures, denote like parts in all the drawings.

I am aware that hooks or brackets have been so made as that they might be moved along on the stick or rod that supports them to space or adjust them thereon. I am also aware that other hooks or brackets have been so hung as that they might be swung up out of the way when not required in use; but I am not aware that any hooks or brackets have been so hung and made as that they may be both moved or adjusted lengthwise on their stick or support and swung up out of use and out of the way or turned down into use at pleasure.

My invention therefore consists in so making and hanging coat or hat brackets or hooks upon their stick, rod, or support as that they may be moved lengthwise thereon to adjust or space them, as well as be swung up out of the way when not required in use.

To enable others skilled in the art to make and use my invention, I will proceed to describe the same with reference to the drawings.

A represents metallic plates or escutcheons of any suitable shape, size, form, or configuration, furnished with holes or slots $a$, by which they may be hung and held firmly to the wall and be removable at any time, if so desired. In the centers of these plates are cam-shaped openings $b$, through which the buttons $c$ on the end hooks, B, are passed, and then by turning said hooks a quarter-revolution, more or less, they become fastened to the plates, and by reversing the operation may as readily be detached again.

Through the end hooks, B, or suitable holes therein, is passed the stick or rod C, upon which the hooks or brackets D are hung. A portion of the stick or rod C is cut away in a concavo-convex form, as shown at $d$, and so as to leave a shoulder at $e$. The openings in the end hooks, B, are made to correspond with the form of the stick or rod, so that when the stick or rod is slipped through them it will be firmly held from turning therein, as it completely fills the openings in said end hooks.

The brackets or hooks D have a circular opening in them, with a shoulder, $f$, projecting into the said opening. When these brackets are in use their projections $f$ come against the shoulder $e$ of the stick C and can go no farther. In this position the brackets can be used for any of the ordinary purposes of such hooks. When any one (two, or more) of them is not required to be used, it can be swung up and back against the wall and out of the way, the cut-away portion of the stick from $e$ to $g$ allowing the projection $f$ to freely pass over that portion.

The whole rack may be put up or taken down in a few moments, as all the parts are detachable from each other and from the wall, and packed away for transportation.

Having thus fully described my invention, what I claim is—

In combination with the cut-away stick or rod and its shoulder $e$, the circular openings in the brackets with their projections $f$, so that said brackets or hooks may be slid along on said rod and turned up out of the way when not required in use, substantially as described.

JOHN DANNER.

Witnesses:
W. W. CLARK,
JAMES J. CLARK.